United States Patent [19]
Schembri

[11] Patent Number: 5,910,288
[45] Date of Patent: Jun. 8, 1999

[54] METHOD AND APPARATUS FOR MIXING A THIN FILM OF FLUID

[75] Inventor: Carol T. Schembri, San Mateo, Calif.

[73] Assignee: Hewlett-Packard Company, Palo Alto, Calif.

[21] Appl. No.: 08/889,763

[22] Filed: Jul. 10, 1997

[51] Int. Cl.⁶ .................. B01L 3/00; G01N 1/10
[52] U.S. Cl. .............. 422/102; 422/944; 436/180
[58] Field of Search .................. 422/102, 104, 422/174, 944; 436/180

[56] References Cited

U.S. PATENT DOCUMENTS

| | | |
|---|---|---|
| 4,007,010 | 2/1977 | Woodbridge, III . |
| 4,007,101 | 2/1977 | Woodbridge, III .................. 23/253 R |
| 4,849,340 | 7/1989 | Oberhardt .............................. 422/57 X |
| 4,869,101 | 9/1989 | Dvorsky ................................... 73/159 |
| 5,044,308 | 9/1991 | Mojtabaj ................................ 118/402 |
| 5,322,799 | 6/1994 | Miller et al. ............................ 436/165 |
| 5,463,223 | 10/1995 | Wong et al. ........................ 250/339.12 |
| 5,551,487 | 9/1996 | Gordon et al. .............................. 141/1 |
| 5,585,639 | 12/1996 | Dorsel et al. ........................ 250/458.1 |
| 5,601,980 | 2/1997 | Gordon et al. .............................. 435/6 |

OTHER PUBLICATIONS

Fodor, Stephen P.A. et al., "Light–Directed, Spatially Addressable Parallel Chemical Synthesis", *Science*, vol. 251, Feb. 15, 1991, pp. 767–773.

Hacia, Joseph G. et al., "Detection of heterozygous mutations in BRCA1 using high density oligonucleotide arrays and two–colour fluorescence analysis", *Nature Genetics*, vol. 14, Dec. 1996, pp. 441–447.

Hamza, E.A., "A Fluid Film Squezzed Between Two Rotating Parallel Plane Surfaces", *Journal of Tribology Technology*, vol. 107, No. 1, Jan. 1985, pp. 110–115.

Kreiner, Thane, "Rapid genetic sequence analysis using a DNA probe array system", *American Laboratory*, Mar. 1996, pp. 39–43.

Lipshutz, R.J. et al., "Using Oligonucleotide Probe Arrays To Access Genetic Diversity", *BioTechniques*, vol. 19, No. 3, 1995, pp. 442–447.

Medlin, Jennifer, "The Amazing Shrinking Laboratory", *Environmental Health Perspectives*, vol. 103, No. 3, Mar. 1995, pp. 244–246.

Southern, E.M. et al., "Analyzing and Comparing Nucleic Acid Sequences by Hybridization to Arrays of Oligonucleotides: Evaluation Using Experimental Models", *Genomics*, vol. 13, 1992, pp. 1008–1017.

Tan, C.A. et al., "Pressure and Flow in Fluid Films Constrained Between Translating and Vibrating Flexible Surfaces", *Int. J. Engineering Science*, vol. 29, No. 12, 1991, pp. 1609–1625.

Wenzel, S.W. et al., "Flexural–Plate Waves for Sensors and Micropumps", *Sensors*, vol. 11, No. 12, Dec. 1994, pp. 47–49.

Yevtushenko, A. et al., "Effect of a Thin Film on the Heat Distribution Between a Stationary Pin and a Rotating Disk", *Numerical Heat Transfer, Part A (Applications)*, vol. 30, No. 8, Dec. 1996, pp. 835–848.

Hewlett–Packard Company product brochure: *Gene Array Scanner*.

*Primary Examiner*—Elizabeth McKane

[57] ABSTRACT

The invention relates to a method and apparatus for mixing thin films of fluid, particularly thin films of chemical, biochemical, or biological fluids undergoing reactions. The invention employs a mixing mechanism which induces mixing within the fluid chamber by moving the inner face of at least one surface of the fluid chamber relative to the inner face of another surface of the fluid chamber, thus enhancing the sensitivity or specificity of the reaction, rate of reaction, extent of reaction, homogeneity, or percentage yield. The invention is particularly useful in enhancing the results of chemical and biological assays.

32 Claims, 4 Drawing Sheets

METHOD AND APPARATUS FOR MIXING A THIN FILM OF FLUID

BACKGROUND

The invention relates to a method and apparatus for mixing a thin film of fluid. More particularly, the invention relates to a method and apparatus for mixing a thin film of chemical, biochemical, or biological fluid undergoing a reaction such as occurs in a chemical or biological assay. Even more particularly, the invention relates to a method and apparatus for mixing a thin film of fluid undergoing a surface reaction such as occurs in a chemical or biological assay.

In many thin film reactions, for example, thin film reactions involving chemical, biochemical, or biological fluids, there is inadequate mixing at the interface between the fluids or between the fluid and the reactive surface. inadequate mixing may occur, for example, because the interface or surface area for reaction is very large and the available fluid sample volume is very small, resulting in a thin film of fluid being spread across the reactive interface or surface which may be on the order of a few microns to a few millimeters thick. In such situations, the fluid may not adequately contact the entire reactive interface or surface. The surface tension or density of the fluid involved in the reaction may be such that adequate mixing of the fluid is difficult to obtain, resulting in inhomogeneities in composition and inconsistent distribution of reactant fluid across the reactive interface or surface. Furthermore, the components of interest in the fluid, such as the components actually involved in the reaction, are frequently present in very low concentrations. Inadequate mixing therefore can cause significant boundary layers or lead to diffusion limited reactions which deleteriously affect the sensitivity or specificity of the reaction, rate of reaction, extent of reaction, homogeneity, or percentage yield.

Inadequate mixing is a particular problem in chemical and biological assays in which very small samples of chemical, biochemical, or biological fluids are typically reacted. For example, the ability to clone and synthesize nucleotide sequences has led to the development of a number of techniques for disease diagnosis and genetic analysis. Genetic analysis, including correlation of genotypes and phenotypes, contributes to the information necessary to reveal the changes in genes which confer disease. New methods of diagnosis of diseases, such as AIDS, cancer, sickle cell anemia, cystic fibrosis, diabetes, muscular dystrophy, and the like, rely on the detection of mutations present in certain nucleotide sequences. Many of these techniques generally involve hybridization between a target nucleotide sequence and a complementary probe, offering a convenient and reliable means for the isolation, identification, and analysis of nucleotides.

One typical method involves hybridization with either target or probe nucleotide sequences immobilized onto a solid support. The stationary phase consists of either numerous targets or probes immobilized onto a solid support having a surface area of typically less than a few square centimeters. The solid support is typically a glass or fused silica slide which has been treated to facilitate attachment of either the targets or probes. The mobile phase containing either the probes or targets is spread or placed on the support, which is then covered with a slide of glass or fused silica. The covered slide is then preferably placed in a environmentally controlled chamber such as an incubator and the hybridization reaction is allowed to proceed. The reactants (either targets or probes) in the mobile phase diffuse through the mobile phase to the interface or surface where the complementary probes or targets are immobilized. Preferably, the mobile phase reactants are labeled, such as through the use of fluorescent tags, so that the identities of the targets and probes undergoing hybridization can be identified and monitored. Alternatively, a detectable label is attached to the hybridized target-probe pair after the hybridization reaction is completed. The hybridization reaction typically takes place over a few minutes to many hours.

DNA arrays have recently been developed for such hybridization reactions in which, for example, photolithographic or deposition methods are used to construct the arrays of oligonucleotides and fluorescence scanning is used to detect the molecular binding events which occur at different points in the array. For descriptions of DNA arrays and associated techniques, see, for example, Kreiner, "Rapid Genetic Sequence Analysis Using A DNA Probe Array System," *American Laboratory*, March, 1996, pp. 39–43; Lipshutz et al., "Using Oligonucleotide Probe Arrays To Access Genetic Diversity," *BioTechniques*, Vol. 19, No. 3, 1995, pp. 442–447; Fodor et al., "Light-Directed, Spatially Addressable Parallel Chemical Synthesis," *Science*, Vol. 251, Feb. 15, 1991, pp. 767–773; Medlin, "The Amazing Shrinking Laboratory," *Environmental Health Perspectives*, Vol. 103, No. 3, March, 1995, pp. 244–246; Southern et al., "Analyzing And Comparing Nucleic Acid Sequences By Hybridization To Arrays Of Oligonucleotides: Evaluation Using Experimental Models," *Genomics*, Vol. 13, 1992, pp. 1008–1017; and Gacia et al., "Detection Of Heterozygous Mutations In BRCA1 Using High Density Oligonucleotide Arrays And Two-Colour Fluorescence Analysis," *Nature Genetics*, Vol. 14, December, 1996, pp. 441–447; all incorporated herein by reference. See also, U.S. Pat. Nos. 5,585,639; 5,601,980; and 5,551,487; all incorporated herein by reference.

Problems are frequently encountered in conducting chemical or biological assays, including use of arrays, with poor hybridization kinetics and efficiency or reaction specificity and sensitivity, since diffusion generally is the only means of moving the reactants in the mobile phase to the interface or surface containing the immobilized reactants. Alternatively, the fluid sample must be removed from the reaction chamber, mixed in separate chambers external to the reaction chamber, and then reintroduced into the reaction chamber. Valuable fluid sample is wasted or lost in the separate external chambers required in such mixing process.

What is needed is a method and apparatus for mixing a thin film of fluid, particularly a chemical, biochemical, or biological fluid undergoing a reaction, which induce sufficient mixing to overcome boundary layer effects and diffusion limited reaction rates. What is further needed is a method and apparatus which is convenient and easy to use, which may be adapted for processing large numbers of samples, which is reproducible and controllable, which minimizes the required sample volume, and which is adapted to automated use.

SUMMARY OF THE INVENTION

In one aspect, the invention is an apparatus for mixing a thin film of fluid, particularly a chemical, biochemical, or biological fluid undergoing a reaction, comprising a first surface having an inner face; a second surface having an inner face, wherein the second surface is located in close proximity to the first surface such that the inner face of the first surface is in opposing relationship to the inner face of the second surface and the two inner faces define a thin fluid chamber between the two surfaces; optionally an opening in one of the surfaces for introducing fluid into the fluid chamber; and a mixing mechanism for mixing fluid within the fluid chamber wherein the mixing mechanism moves the inner face of at least one surface relative to the inner face of the other surface, such that mixing of fluid is induced within the fluid chamber.

In a preferred embodiment, the fluid chamber comprises a reactive chamber for a chemical, biochemical, or biological fluid and the mixing mechanism is effective to enhance sensitivity or specificity of the reaction, rate of reaction, extent of reaction, homogeneity, or percentage yield. In a particularly preferred embodiment, the apparatus additionally comprises a plurality of chemical, biochemical, or biological moieties attached to at least one of the inner face of the first surface or the inner face of the second surface, wherein the chemical, biochemical, or biological moieties are selected from the group consisting of DNA, RNA, proteins, reagents, and combinations, derivatives, and modifications thereof. In an alternative embodiment, a dye, label, tag, or reagent may be dried onto or otherwise attached to at least one inner face of a surface. Once the fluid is introduced into the fluid chamber and mixed using the inventive apparatus and method, the reaction can proceed and be immediately monitored.

In another preferred embodiment, the apparatus is adapted for automated use. In still another preferred embodiment, the apparatus is adapted for use with multiple fluid chambers simultaneously. In still another preferred embodiment, the apparatus additionally comprises an environmental controller.

Another aspect of the invention involves a method for mixing a thin film of fluid, particularly a chemical, biochemical, or biological fluid, employing the inventive apparatus.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is a schematic diagram of an apparatus of the present invention wherein the first surface (2) and the second surface (8) are substantially planar and in the shape of a disc. The mixing mechanism (18) comprises a rotating mechanism and the apparatus additionally comprises a seal (22).

FIG. 2 is a schematic diagram of an apparatus of the present invention wherein the first surface (2) and the second surface (8) are substantially planar and in the shape of a rectangle. The mixing mechanism (18) comprises a compression inducing mechanism and the apparatus has an open edge.

FIG. 3 is a schematic diagram of an apparatus of the present invention wherein the first surface (2) and the second surface (8) are substantially planar and in the shape of a rectangle. The mixing mechanism (18) comprises a tension inducing mechanism.

FIG. 5 is a schematic diagram of an apparatus of the present invention wherein the first surface (2) and the second surface (8) are substantially planar and in the shape of a disc. The mixing mechanism (18) comprises a rotating mechanism and a localized compression inducing mechanism.

FIG. 6 is a schematic diagram of an apparatus of the present invention wherein the first surface (2) and the second surface (8) are substantially planar and in the shape of a disc. The mixing mechanism (18) comprises a rotating mechanism (not shown) and a localized compression inducing mechanism such as illustrated in FIG. 5. The fluid chamber (14) comprises a reactive chamber for a chemical, biochemical, or biological fluid and the apparatus additionally comprises a plurality of chemical, biochemical, or biological moieties (20) attached to the inner face of at least one surface.

DETAILED DESCRIPTION

Figure 1A:
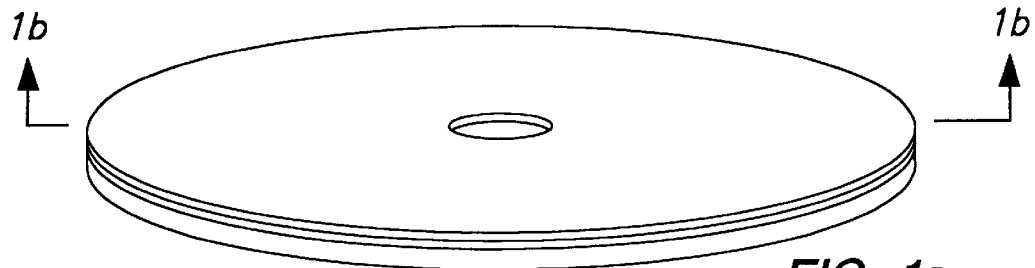
FIG. 1a illustrates a perspective view of the apparatus.

The apparatus of the invention preferably includes a first surface having an inner face and an outer face and a second surface having an inner face and an outer face, wherein the second surface is located in close proximity to the first surface such that the inner face of the first surface is in opposing relationship to the inner face of the second surface. The two opposing inner faces thus define a thin fluid chamber between the two surfaces. In certain embodiments, the chamber may have either open or closed edges between the inner faces of the two surfaces. The chamber may be on the order of a micron to several millimeters in thickness, preferably from about 1 micron to about 5 millimeters in thickness, more preferably from about 3 microns to about 1 millimeter in thickness, even more preferably from about 5 microns to about 100 microns in thickness. The active surface area of each inner face of each surface, that is, the area of each face which comes into contact with fluid, is on the order of about 10 square millimeters to about 20 square centimeters, more preferably from about 100 square millimeters to about 10 square centimeters, even more preferably from about 200 square millimeters to about 10 square centimeters. The active volume of the fluid chamber, that is, the volume of the fluid chamber which comes into contact with fluid, is preferably less than about 300 microliters, more preferably less than about 150 microliters, even more preferably less than about 50 microliters.

Each of the first surface and second surface may be of any convenient shape which defines a fluid chamber suitable for its intended use. Each of the first surface and the second surface are preferably substantially planar and may be, for example, in the shape of a circle, an ellipse, a square, a rectangle, or any other convenient planar shape. The surfaces may be fabricated from any material which is compatible with the fluids with which the surfaces come into contact, such as, for example, plastics, glass, fused silica, silicon, or metal. Each of the surfaces may independently be rigid or flexible, depending upon the mixing mechanism utilized, as further described below. In a preferred embodiment, the apparatus has closed edges such that the apparatus additionally includes a seal between the inner face of the first surface and the inner face of the second surface. In certain embodiments, the seal is preferably flexible and is fabricated from a material which is compatible with the fluids with which the seal comes into contact. The seal may be fabricated from, for example, adhesives, rubber, or plastic. In a preferred embodiment, the apparatus preferably includes an opening in one of the surfaces for introducing fluid into the fluid chamber. The opening may be a port or other entrance which is conveniently located for introducing fluid into the fluid chamber.

The apparatus of the invention utilizes a mixing mechanism for mixing fluid within the fluid chamber wherein the mixing mechanism moves the inner face of at least one surface relative to the inner face of the other surface, such that mixing of fluid is thereby induced within the fluid chamber. Any mechanism which moves the inner face of at least one surface relative to the inner face of the other surface and which thereby induces (including enhances) mixing of fluid within the fluid chamber may be used. The mixing mechanism may for example, comprise a rotating mechanism, a compression inducing mechanism, a tension inducing mechanism, a shear inducing mechanism, or a combination thereof. The movement of the inner face of one surface relative to the inner face of the other surface may be in any suitable direction, such as, for example, in an axial, radial, longitudinal, up, down, sideways, outer, or inner direction.

In certain preferred embodiments, at least one of the first surface and the second surface comprises a flexible material and the mixing mechanism comprises a rotating mechanism, a compression inducing mechanism, a tension inducing mechanism, a shear inducing mechanism, or combinations thereof. The flexible material preferably possesses a low stiffness or a low spring constant or spring rate. Stiffness or spring rate is defined as the ratio of the applied force to the corresponding displacement in the surface. The spring rate is a function of the elastic modulus of the material forming the surface, the moment of inertia of the shape of the surface, and the thickness of the surface. When the surface is displaced (or strained) by an applied force, stress is induced in the surface. To be useful in the invention, the stress induced by the displacement should be less than the elastic limit of the material chosen for the surface. The flexible material may be, for example, a thin sheet, film, or membrane, which in certain embodiments is preferably fabricated from a biocompatible material. The thin sheet, film, or membrane may preferably be fabricated from a material selected from the group consisting of polypropylene, polyethylene, a cellulosic material, and silicon.

In such embodiments when, for example, the mixing mechanism comprises a rotating mechanism, the optimal speed of rotation depends upon the specific design of the apparatus, including the materials of the opposing surfaces of the fluid chamber, the reactive fluid properties, the thickness of the fluid chamber, the amount of reactive fluid, and the size and shape of the fluid chamber. The rotational speed may, for example, be in the range of a few hundred rotations per minute (rpm) to several thousand rpm. The rotational speed is preferably at least about 200 rpm, more preferably at least about 600 rpm, even more preferably at least about 2,000 rpm. Preferably, the fluid chamber is rotated at a speed sufficient to generate a force of at least approximately 1 X gravity (g). More preferably, the fluid chamber is rotated at a speed sufficient to generate a force of at least about 10 X g to about 100 X g. The upper limit of the rotational force or speed is dictated by the strength of the seal, if any, and the elastic limit of the material(s) forming the surface(s). This applied rotational force causes the reactive fluid to move towards the seal or edge (open or closed) of the fluid chamber. (If the apparatus has an open edge, the rotational force or speed utilized is preferably only a few hundred rpm in order to minimize loss of fluid from the fluid chamber.) The rotational force also causes the flexible material forming one of the opposing surfaces of the fluid chamber to move outward or "bulge out" relative to the other surface. When the rotational speed is slowed or stopped, the flexible surface preferentially returns to about its original shape and position due to the elasticity of the material from which the flexible surface is fabricated. This movement of the flexible surface forces the reactive fluid to redistribute across the fluid chamber. By alternating between fast rotation and slow or no rotation, the reactive fluid is moved back and forth within the fluid chamber, thus inducing mixing within the fluid chamber.

The efficiency and rate of mixing may be further enhanced by combining such a rotational mixing mechanism with one or more other mixing mechanisms such as a compression inducing mechanism, a tension inducing mechanism, or a shear inducing mechanism. Such additional mixing mechanisms may provide generalized (over substantially the entire inner face of a surface) or localized sources of compression, tension, or shear with respect to the fluid within the fluid chamber. For example, as the fluid chamber is rotating, the flexible surface of the fluid chamber may be contacted with a small roller, pin, or other localized compression mechanism. The compression mechanism compresses the flexible surface when and at the point the flexible surface moves past the localized compression mechanism, thus causing the flexible surface to move towards the other surface and temporarily or transitorily forcing movement of at least a portion of the fluid at a region within the fluid chamber into some other region. The compression mechanism can be combined with alternating rotation or with continuous rotation. Other variations are possible, including replacing the localized compression inducing mechanism with a localized tension inducing mechanism or generalized shear inducing mechanism.

A generalized or localized compression inducing mechanism may be used as the sole mixing mechanism or in conjunction with other mixing mechanisms such as a rotating mechanism as previously described hereinabove. Alternatively, such a compression inducing mechanism also may be movable such that the location of compression on the flexible surface is moved from location to location while the fluid chamber remains fixed in a stationary position or, for example, set in a continuously or intermittently rotating motion, a continuously or intermittently side-to-side motion, or a continuously or intermittently up and down or back motion.

A generalized or localized tension inducing mechanism may be used as the sole mixing mechanism or in conjunction with other mixing mechanisms. Such a tension inducing mechanism may include, for example, use of a mechanical or magnetic attachment or use of a vacuum on the outer face of the flexible surface so as to pull or stretch the flexible surface away from the other surface of the fluid chamber, the tensile force thus applied increasing the thickness of the fluid chamber in a localized region within the fluid chamber. This movement of the flexible surface relative to the other surface causes the fluid to flow into the expanded region from surrounding regions. When the tensile force imparted by the tension inducing mechanism is released, the flexible surface returns to about its original shape and position, forcing the fluid to move out of the previously expanded localized region and thus imparting mixing within the fluid chamber. The tension inducing mechanism may be movable such that the tension exerted on the flexible surface is moved from location to location while the fluid chamber remains fixed in a stationary position or, for example, set in a continuously or intermittently rotating motion, a continuously or intermittently side-to-side motion, or a continuously or intermittently up and down or back motion. Alternatively, the fluid chamber may be moved to apply the tension inducing mechanism to different locations of the fluid chamber.

A generalized shear inducing mechanism may be used as the sole mixing mechanism or in conjunction with other mixing mechanisms. Such a shear inducing mechanism may include, for example, providing a mechanism to move a surface of the fluid chamber sideways relative to the other surface, or one surface may be rotated relative to the other surface.

In certain preferred embodiments, the first surface and the second surface each comprise a rigid material and the mixing mechanism comprises a rotating mechanism, a tension inducing mechanism, a compression inducing mechanism, a shear inducing mechanism, or a combination thereof as previously described hereinabove. The rigid material may be, for example, fused silica, glass, ceramic, metal, plastic, or silicon. In certain embodiments, the compression inducing mechanism or the tension inducing mechanism may be movable such that the location of compression or tension on the surface is moved from location to location while the fluid chamber remains fixed in a stationary position, or set in a continuously or intermittently rotating motion, a continuously or intermittently side-to-side motion, or a continuously or intermittently up and down or back motion as previously described hereinabove. Alternatively, the fluid chamber may be moved to apply the compression or tension inducing mechanism to different locations of the fluid chamber.

In certain preferred embodiments, the apparatus additionally comprises a environmental controller which maintains or controls the fluid chamber at certain environmental conditions. For example, the environmental controller may be a temperature controller which maintains the fluid chamber at a temperature of, for example, in certain chemical, biochemical, or biological assays, preferably between about 5 degrees Celsius and about 100 degrees Celsius, more preferably between about 5 degrees Celsius and about 65 degrees Celsius, even more preferably between about 25 degrees Celsius and about 65 degrees Celsius. In certain preferred embodiments, temperature programming features may be included as part of the temperature controller, so that the temperature of the fluid chamber may be varied over time, that is, appropriately increased or decreased during the reaction. For example, the ability to increase or decrease temperature by about 0.5 degrees Celsius per minute or hour to about 10 degrees Celsius per minute or hour may be provided. In embodiments wherein temperature control is provided, the fluid chamber may optionally be insulated. Alternatively, the inventive apparatus may be placed inside a temperature controlled environmental chamber.

In certain preferred embodiments, the apparatus is adapted for automated use, such as through the use of various controllers, computers, and the like. In certain preferred embodiments, the apparatus is adapted for use with multiple fluid chambers simultaneously. In a preferred embodiment, the temperature controlled environment is capable of containing and mixing multiple fluid chambers.

In certain preferred embodiments, the fluid chamber of the apparatus comprises a reactive chamber for a chemical, biochemical, or biological fluid and the mixing mechanism is effective to enhance the sensitivity or specificity of reaction, rate of reaction, extent of reaction, homogeneity, or percentage yield. In certain embodiments, the apparatus additionally comprises a plurality of chemical, biochemical, or biological moieties attached to at least one of the inner face of the first surface or the inner face of the second surface. Such chemical, biochemical, or biological moieties are preferably selected from the group consisting of DNA, RNA, proteins, reagents, and combinations, derivatives, and modifications thereof. Such chemical, biochemical, or biological moieties may be attached or linked to the surface or surfaces through a variety of methods known in the art, including through use of chemical, biochemical, or biological arrays. See, for example, Kreiner, "Rapid Genetic Sequence Analysis Using A DNA Probe Array System," *American Laboratory*, March, 1996, pp. 39–43; Lipshutz et al., "Using Oligonucleotide Probe Arrays To Access Genetic Diversity," *BioTechniques*, Vol. 19, No. 3, 1995, pp. 442–447; Fodor et al., "Light-Directed, Spatially Addressable Parallel Chemical Synthesis," *Science*, Vol. 251, Feb. 15, 1991, pp. 767–773; Medlin, "The Amazing Shrinking Laboratory," *Environmental Health Perspectives*, Vol. 103, No. 3, March, 1995, pp. 244–246; Southern et al., "Analyzing And Comparing Nucleic Acid Sequences By Hybridization To Arrays Of Oligonucleotides: Evaluation Using Experimental Models," *Genomics*, Vol. 13, 1992, pp. 1008–1017; and Gacia et al., "Detection Of Heterozygous Mutations In BRCA1 Using High Density Oligonucleotide Arrays And Two-Colour Fluorescence Analysis," *Nature Genetics*, Vol. 14, December, 1996, pp. 441–447; all incorporated herein by reference. See also, U.S. Pat. Nos. 5,585,639; 5,601,980; and 5,551,487; all incorporated herein by reference. In certain chemical, biochemical, or biological assays, the density of chemical, biochemical, or biological moieties is preferably greater than about 100 per square micron, more preferably greater than about 1,000 per square micron, even more preferably greater than about 5,000 per square micron.

In alternative preferred embodiments, a dye, label, tag, reagent, or derivatives, modifications, or combinations thereof may be dried, lyophilized, or otherwise attached to at least one of the inner faces of the surfaces. The quantity of material used should be appropriate for the specific application. The chemical, biochemical, or biological fluid is introduced into the fluid chamber and the mixing process initiated. The mixing mechanism inducing mixing within the fluid chamber will rehydrate the dye, label, tag, or reagent and homogeneously mix the chemical, biochemical, or biological fluid with the fluid chamber, allowing the desired reaction or labeling to proceed. The reaction can be monitored after the mixing process is completed or interspersed with the mixing process if necessary or desired. This process is particularly advantageous for fluids or reactions which are optically dense and, therefore, must be analyzed in a very thin section or film by a spectrophotometer or other analytical means. This process is also an advantage for specimens such as cellular suspensions or thin biopsies which will be visually inspected in thin sections or films for accurate count, diagnosis, or other analysis. This process is also an advantage when the sample is particularly valuable or only available in minute quantities.

In yet another embodiment, two different fluids can be introduced into the fluid chamber and mixed to at least substantial homogeneity. This is advantageous when it is inconvenient or not possible to dry, lyophilize, or otherwise attached the dye, label, tag, or reagent to at least one of the inner faces of the surfaces. This process is also an advantage when the sample or reagents used are particularly valuable or only available in minute quantities.

Illustrative methods of using the inventive apparatus are described in conjunction with FIGS. 1 to 6. Features or parts of the inventive apparatus which are the same or similar in each Figure utilize the same reference numbers.

Figure 1B:
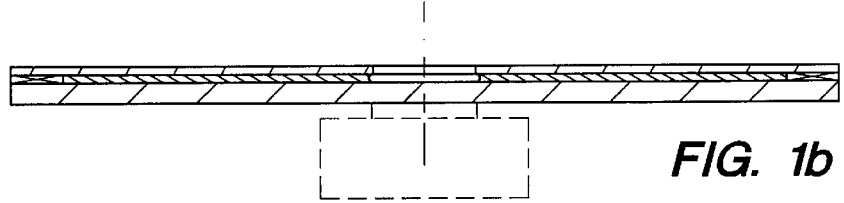
FIG. 1b is a view illustrating the apparatus in stationary mode.
Figure 1C:
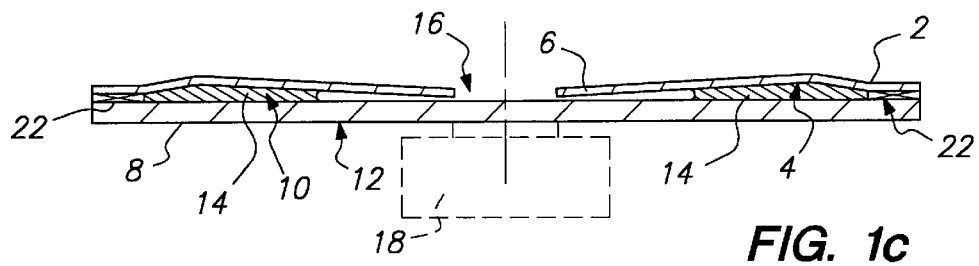
FIG. 1c is a view illustrating the apparatus in operational (rotating) mode.
Figure 2A:
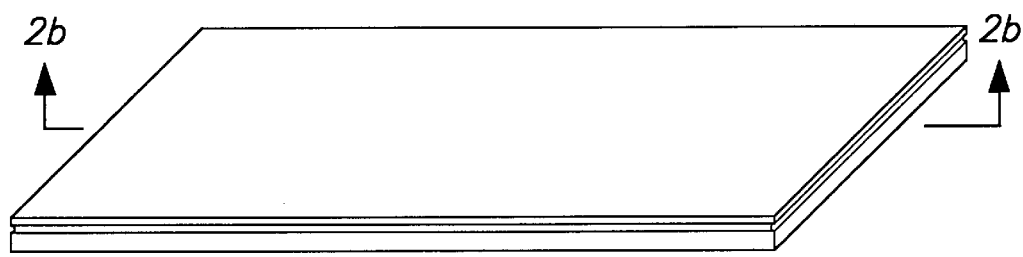
FIG. 2a illustrates a perspective view of the apparatus.
Figure 2B:
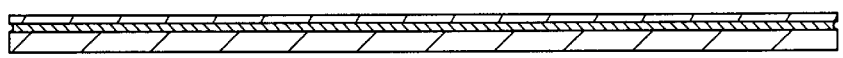
FIG. 2b is a view illustrating the apparatus in stationary mode.
Figure 2C:
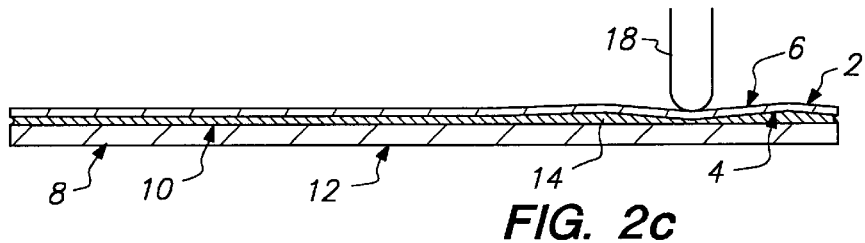
FIG. 2c is a view illustrating the apparatus in operational (compression) mode.
Figure 3A:
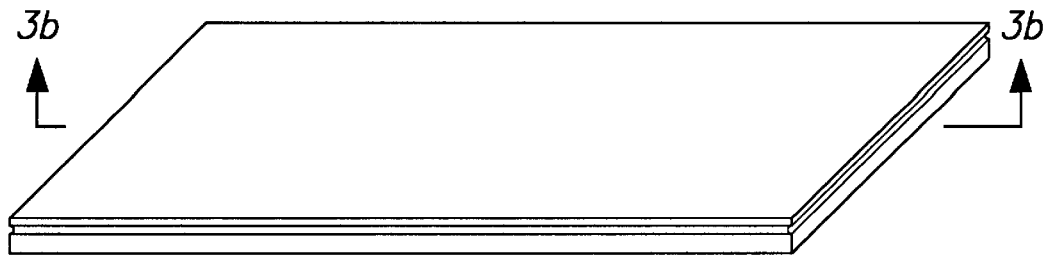
FIG. 3a illustrates a perspective view of the apparatus.
Figure 3B:
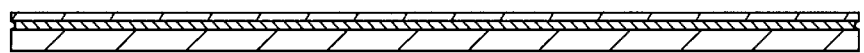
FIG. 3b is a view illustrating the apparatus in stationary mode.
Figure 3C:
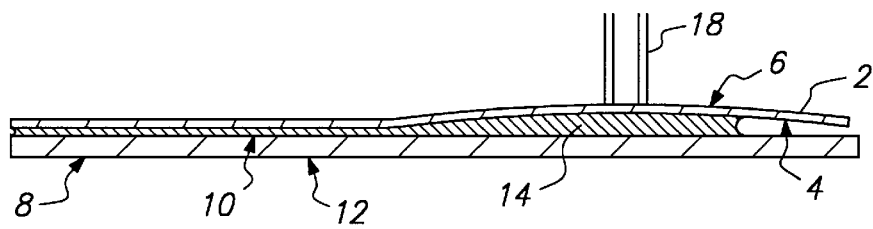
FIG. 3c is a view illustrating the apparatus in operational (tension) mode wherein the mixing mechanism (18) is attached to a vacuum source (not shown).
Figure 4:
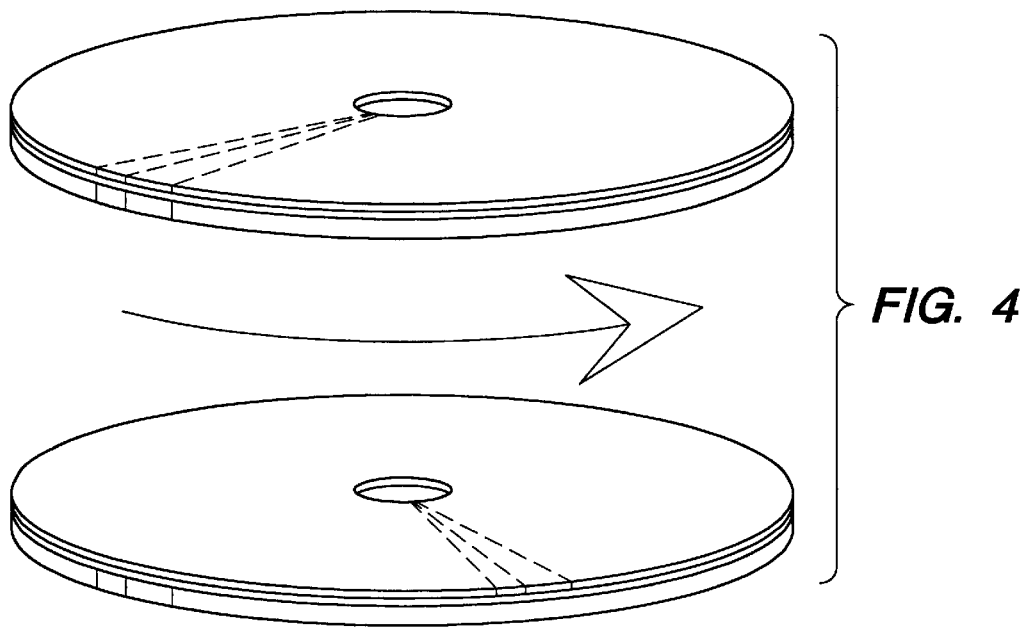
FIG. 4 is a schematic diagram of an apparatus of the present invention wherein the mixing mechanism comprises a shear inducing mechanism.
Figure 5A:
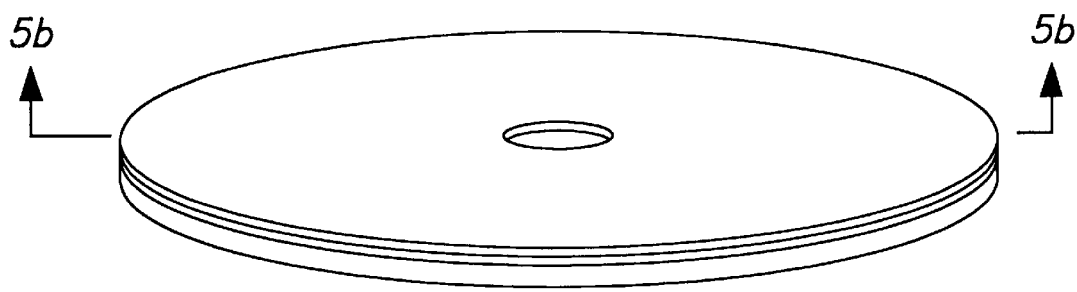
FIG. 5a illustrates a perspective view of the apparatus.
Figure 5B:
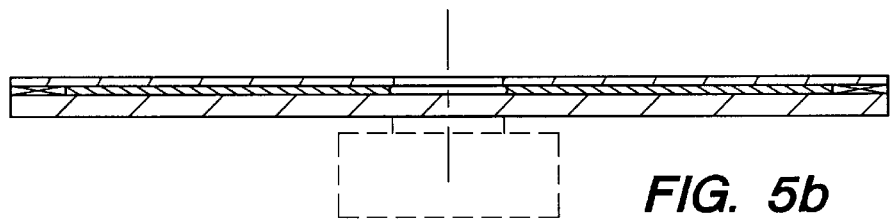
FIG. 5b is a view illustrating the apparatus in stationary mode.
Figure 5C:
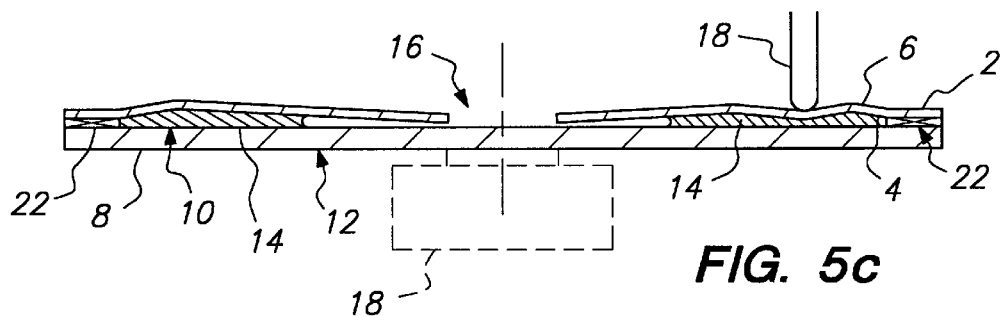
FIG. 5c is a view illustrating the apparatus in operational (rotating and compression) mode.
Figure 6A:
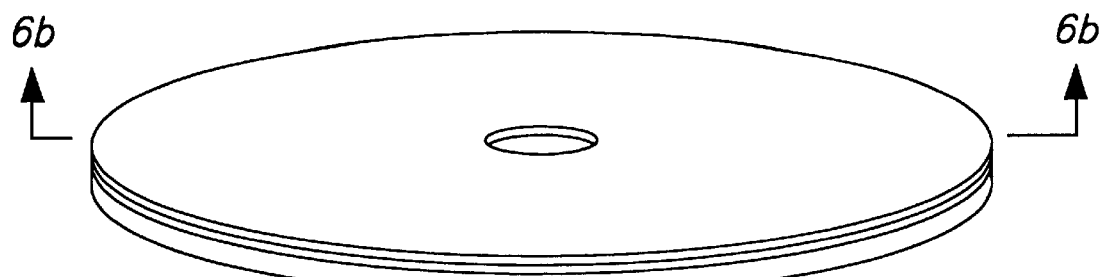
FIG. 6a illustrates a perspective view of the apparatus.
Figure 6B:
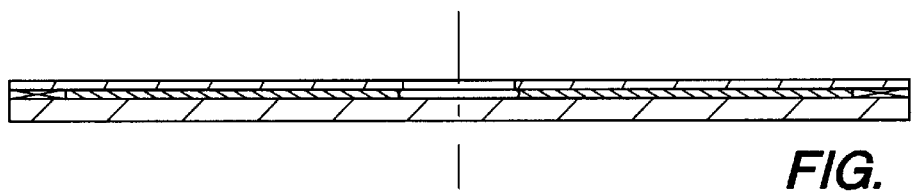
FIG. 6b is a view illustrating the apparatus in stationary mode.
Figure 6C:
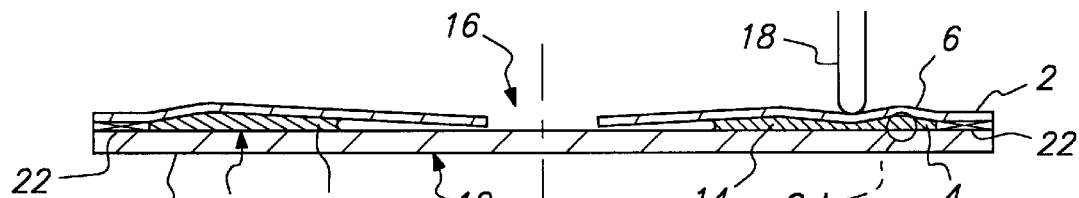
FIG. 6c is a view illustrating the apparatus in operational (rotating and compression) mode.
Figure 6D:
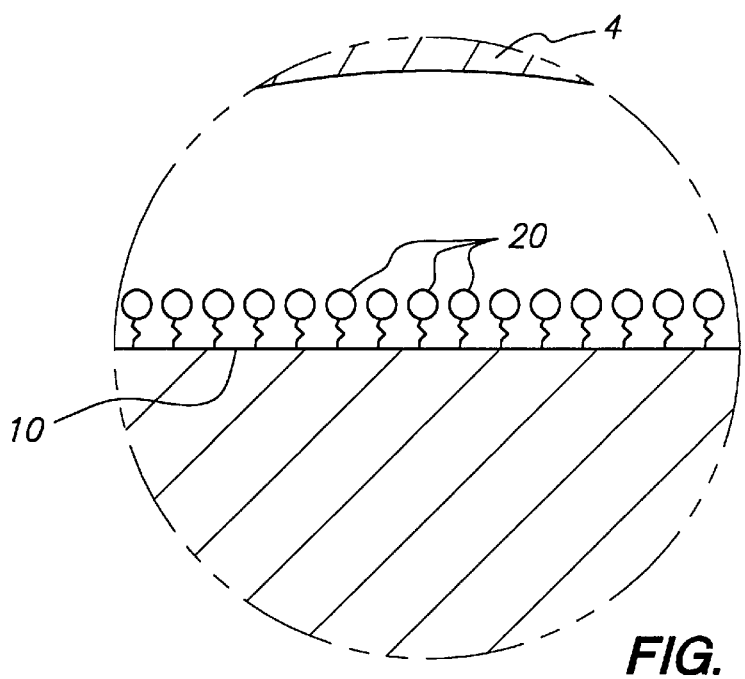
FIG. 6d is an enlarged view of the plurality of chemical, biochemical, or biological moieties (20) attached to the inner face (10) of second surface (8).

In FIG. 1, the apparatus has a first substantially planar surface (2) having an inner face (4) and an outer face (6), and a second substantially planar surface (8) having an inner face (10) and outer face (12). The second surface (8) is located in close proximity to the first surface (2) such that the inner face (4) of the first surface (2) is in opposing relationship to the inner face (10) of the second surface (8). The two inner faces (2 and 10) define a thin fluid chamber (14) between the two surfaces (2 and 8). Optionally, the apparatus includes an opening (16) in one of the surfaces (2 or 8) for introducing fluid into the fluid chamber (14). Optionally, the apparatus includes a seal (22) between the inner face (4) of the first surface (2) and the inner face (10) of the second surface (8). The apparatus includes a mixing mechanism (18) for mixing fluid within the fluid chamber (14) wherein the mixing mechanism (18) moves the inner face of at least one surface (2 or 8) relative to the inner face of the other surface (8 or 2), such that mixing of fluid is induced within the fluid chamber (14). In FIG. 1, the mixing mechanism (18) is a rotating mechanism. In FIG. 2, the mixing mechanism (18) is a compression inducing mechanism. In FIG. 3, the mixing mechanism (18) is a tension inducing mechanism. In FIG. 4, the mixing mechanism (18) is a shear inducing mechanism. In FIG. 5, the mixing mechanism (18) comprises a rotating mechanism and a localized compression inducing mechanism. In FIG. 6, the fluid chamber (14) comprises a reactive chamber for a chemical, biochemical, or biological fluid and the inventive apparatus additionally comprises a plurality of chemical, biochemical, or biological moieties (20) attached to the inner face (2 or 10) of at least one surface (2 or 8).

During operation, fluid such as a reactive fluid containing nucleotide targets (with or without suitable labels or tags) may be introduced into the apparatus via opening (16). Alternatively, the fluid may be introduced into the fluid chamber through an open edge or prior to sealing a fluid chamber having a closed edge. The mixing mechanism (18), if not previously started prior to introduction of the fluid into the fluid chamber (14), is turned on and is operated at least until sufficient mixing of the fluid within the fluid chamber (14) has occurred. The mixing mechanism (18) also may be operated continuously at the same or different conditions during the reaction, which in the case of a hybridization reaction may take place over a few minutes to many hours such as, for example, about one minute to about twenty-four hours. Alternatively, the mixing mechanism (18) may be started and stopped intermittently during the course of the reaction. Environmental control, including, for example, temperature control and monitoring (including temperature programming), may optionally be provided. Once the reaction progresses to the desired stage of completion or the established reaction time has passed, the mixing mechanism (18) may be stopped. Alternatively, mixing may be continued with the mixing mechanism (18) as the fluid chamber (14) is optionally washed or flushed in order to remove excess unreacted fluid. The fluid chamber (14) may also optionally be flushed or washed with subsequent reactive fluids in order to, for example, derivitize, label, or otherwise modify the reacted chemical, biochemical, or biological moieties.

EXAMPLES

One embodiment of the apparatus of the present invention is fabricated and used according to the following description. An array of DNA probes is constructed by attaching a plurality of known probes comprising oligomers, PCR product, or cDNA at specific discrete locations on a circular glass substrate having a surface area of about 20 square centimeters using conventional array construction techniques. A flexible disc consisting of a thin plastic film or membrane is attached to the glass substrate and sealed at the periphery using adhesive, thus forming a fluid chamber having a closed edge. The location and the thickness of the seal around the periphery of the flexible disc respectively defines the active surface area and the thickness of the fluid chamber. The active surface area of the fluid chamber is about 10 square centimeters and the thickness of the fluid chamber is about 50 microns.

About 50 microliters of reactive fluid, comprising a sample of DNA, is injected through an opening in approximately the center of the disc into the fluid chamber with a microsyringe. The fluid chamber is rotated by a rotating mechanism such as a motor at an appropriate rotational speed in order to distribute the reactive fluid across the active surface area of the fluid chamber. If a venting port is provided so that air within the fluid chamber may be readily displaced and vented through the venting port, the reactive fluid wets the opposing faces of the fluid chamber and the fluid chamber readily fills by capillary action. If a venting port is not provided to vent the air from the fluid chamber, the rotational speed must be high enough to force the fluid meniscus to break up sufficiently to allow the air to bubble out through the meniscus.

The optimal speed of rotation depends upon the specific design of the apparatus, including the materials of the opposing surfaces of the fluid chamber, the reactive fluid properties, the thickness of the fluid chamber, the amount of reactive fluid, and the size and shape of the fluid chamber. The rotational speed may, for example, be in the range of a few hundred rotations per minute (rpm) to a several thousand rpm. For a 5.08 centimeter diameter round glass substrate sealed to a plastic disc with a 1 centimeter diameter opening for introducing aqueous reactive fluid in the center of the disc, and a fluid chamber with a thickness of from about 30 micrometers to about 70 micrometers, rotational speeds in the range of from about 1250 rpm to about 3000 rpm are sufficient to distribute the reactive fluid within the fluid chamber.

Once the reactive fluid is distributed within the fluid chamber, mixing proceeds. One approach is to rotate the fluid chamber at a speed sufficient to generate a force of approximately 1 X gravity (g). More preferably, the fluid chamber is rotated at a speed sufficient to generate a force of at least about 10 X g to about 100 X g. This applied force causes the reactive fluid to move towards the seal or edge of the fluid chamber and the flexible disc forming one of the opposing surfaces of the fluid chamber moves or "bulges out" relative to the other surface formed by the glass substrate. When the rotational speed is slowed or stopped, the flexible disc preferentially returns to about its original shape and position due to the elasticity of the material from which the flexible disc is fabricated. This movement of the flexible disc forces the reactive fluid to redistribute across the fluid chamber and the immobilized array. By alternating between fast rotation and slow or no rotation, the reactive fluid is moved back and forth across the immobilized array, thus inducing mixing within the fluid chamber.

The efficiency and rate of mixing is further enhanced by placing a small movable roller, pin, or other localized compression source on the flexible surface as the fluid chamber is rotating. The compression source compresses the flexible disc at the point the flexible disc moves past the localized compression source, thus forcing movement of at least a portion of the fluid at the applied location into some other location. The compression source is particularly advantageous to enhance mixing of the fluid at the periphery of the fluid chamber. The compression source can be combined with alternating rotation or with continuous rotation. Alternatively, the fluid chamber may remain fixed and the localized compression source moved. Other variations are possible, include replacing the localized compression source with a localized tension source or generalized shearing source.

The invention is useful for a wide variety of applications in laboratory, commercial, or industrial environments involving the analysis or reaction of thin films of fluids, particularly thin films of chemical, biochemical, or biological fluids, where adequate or complete mixing of fluid is necessary or desirable. The invention has particular application in the performance of chemical or biological assays, such as the reaction of target DNA with complementary probes, reaction and analysis of protein arrays, combinatorial chemistry, and the like. The invention also has applicability in the analysis of optically dense fluids, such as by transmission spectroscopy used to analyze or monitor thin films of fluids undergoing a chemical reaction or to analyze the properties of a fluid. The invention may also be used to mix very minute sample volumes with liquid reagents prior to analysis by analytical equipment, such as capillary electrophoresis. The invention may also be used to label and analyze cellular suspensions or biopsies.

Although several specific embodiments of the invention have been described and illustrated herein, the invention is not to be limited to the specific examples, forms, or arrangements of parts so described and illustrated. The invention is limited only by the claims.

What is claimed is:

1. Apparatus for mixing a film of fluid, comprising:
    a first substantially planar surface having an inner face;
    a second substantially planar surface having an inner face, wherein the second surface is substantially parallel to and proximate to the first surface such that the inner face of the first surface is in opposing relationship to the inner face of the second surface and the two inner faces define a fluid chamber between the two surfaces;
    optionally an opening in one of the surfaces for introducing fluid into the fluid chamber; and
    means for rotating the first and second surfaces about an axis generally normal to the planes thereof at variable angular velocities in a range including higher velocities great enough to cause a fluid within the fluid chamber to move centrifugally away from the rotational axis, such that mixing of fluid is induced within the fluid chamber.

2. The apparatus of claim 1, wherein the fluid chamber has a thickness of less than about 1 millimeter.

3. The apparatus of claim 2, wherein the fluid chamber has a thickness of less than about 100 microns.

4. The apparatus of claim 1, wherein the fluid chamber has an active volume of less than about 150 microliters.

5. The apparatus of claim 1, wherein the surface area of each face of the first surface and second surface that comes in contact with fluid is less than about 20 square centimeters.

6. The apparatus of claim 1, wherein each of the first surface and the second surface are in the shape of a circle, ellipse, square, or rectangle.

7. The apparatus of claim 1, wherein at least one of the first surface and the second surface comprises a flexible material capable of resiliently flexing away from and toward the other surface in response to changes in pressure locally within the fluid chamber resulting from centrifugal and centripetal movement of the fluid in the fluid chamber.

8. The apparatus of claim 7, further comprising a compression inducing mechanism.

9. The apparatus of claim 7, further comprising a tension inducing mechanism.

10. The apparatus of claim 7, further comprising a movable localized compression inducing mechanism, a movable localized tension inducing mechanism, a generalized shear inducing mechanism, or a combination thereof.

11. The apparatus of claim 10, wherein at least one of the first surface and the second surface comprises a flexible material and wherein the flexible material comprises a sheet, film, or membrane.

12. The apparatus of claim 11, wherein the thin sheet, film, or membrane comprises a biocompatible material.

13. The apparatus of claim 12, wherein the thin sheet, film, or membrane is selected from the group consisting of polypropylene, polyethylene, a cellulosic material, and silicon.

14. The apparatus of claim 1, wherein at least one of the first surface and the second surface comprises fused silica, glass, plastic, metal, or silicon.

15. The apparatus of claim 1, additionally comprising a seal between the inner face of the first surface and the inner face of the second surface.

16. The apparatus of claim 15, wherein the seal is flexible.

17. The apparatus of claim 1, additionally comprising a plurality of chemical, biochemical, or biological moieties attached to at least one of the inner face of the first surface or the inner face of the second surface.

18. The apparatus of claim 17, wherein the chemical, biochemical, or biological moieties are selected from the group consisting of DNA, RNA, proteins, reagents, and combinations, derivatives, and modifications thereof.

19. The apparatus of claim 18, wherein the density of chemical, biochemical, or biological moieties is greater than about 100 per square micron.

20. The apparatus of claim 19 wherein the density of chemical, biochemical, or biological moieties is greater than about 5,000 per square micron.

21. The apparatus of claim 1 additionally comprising a plurality of dyes, labels, tags, reagents, or modifications, derivatives, or combinations thereof, attached to at least one of the inner face of the first surface or the inner face of the second surface.

22. The apparatus of claim 1 additionally comprising an environmental controller which maintains or controls the environmental conditions within the fluid chamber.

23. The apparatus of claim 22, wherein the environmental controller comprises a temperature controller.

24. The apparatus of claim 1, wherein the apparatus is adapted for automated use.

25. The apparatus of claim 1, wherein the apparatus comprises multiple fluid chambers.

26. A method for mixing a film of fluid, comprising:

introducing into an apparatus according to claim 1 at least one reactive chemical, biochemical, or biological fluid; mixing the fluid; and consecutively or simultaneously reacting the fluid.

27. The apparatus of claim 26, wherein the fluid is a chemical, biochemical, or biological fluid.

28. The method of claim 26, wherein the fluid chamber has a thickness of less than about 100 microns.

29. The method of claim 28, wherein the volume of fluid introduced into the fluid chamber is less than about 150 microliters.

30. The method of claim 26, said apparatus further comprising a movable localized compression inducing mechanism, a movable localized tension inducing mechanism, a generalized shear inducing mechanism, or a combination thereof.

31. The method of claim 30, additionally comprising an environmental controller which maintains or controls the environmental conditions within the fluid chamber.

32. The method of claim 30, wherein the method is automated.

* * * * *